US007746206B2

(12) United States Patent
Park

(10) Patent No.: US 7,746,206 B2
(45) Date of Patent: Jun. 29, 2010

(54) INVERTER TRANSFORMER AND INVERTER POWER MODULE HAVING THE SAME FOR USE IN ELECTRIC/ELECTRONIC DEVICE

(75) Inventor: Cheol-jin Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 11/770,770

(22) Filed: Jun. 29, 2007

(65) Prior Publication Data

US 2008/0180207 A1      Jul. 31, 2008

(30) Foreign Application Priority Data

Jan. 26, 2007     (KR) ...................... 10-2007-0008393

(51) Int. Cl.
*H01F 27/30* (2006.01)
*H01F 27/02* (2006.01)
*H01F 38/30* (2006.01)
*H01F 27/24* (2006.01)

(52) U.S. Cl. ........................ 336/198; 336/83; 336/84 R; 336/96; 336/212

(58) Field of Classification Search ................ 336/83, 336/84 R, 96, 198, 212
See application file for complete search history.

(56) References Cited

U.S. PATENT DOCUMENTS 6,894,596 B2 *   5/2005   Suzuki ....................... 336/83

FOREIGN PATENT DOCUMENTS

JP                03171607 A   *   7/1991

* cited by examiner

*Primary Examiner*—Elvin G Enad
*Assistant Examiner*—Ronald W Hinson
(74) *Attorney, Agent, or Firm*—Sughrue Mion, PLLC

(57) ABSTRACT

An inverter power module for use in an electric/electronic device includes a driving circuit board, a power transformer mounted on the driving circuit board, an inverter transformer mounted on the driving circuit board, and a blocking unit to block a magnetic flux that is generated from the inverter transformer from being emitted to the outside. With this, the magnetic flux that is generated from the inverter transformer is blocked from being emitted to the outside, thereby allowing an EMI noise, a heating problem, a noise of the system circuit, etc. to be minimized.

8 Claims, 6 Drawing Sheets

INVERTER TRANSFORMER AND INVERTER POWER MODULE HAVING THE SAME FOR USE IN ELECTRIC/ELECTRONIC DEVICE

CROSS-REFERENCE TO RELATED APPLICATIONS

This application claims priority under 35 U.S.C. §119(a) from Korean Patent Application No. 10-2007-8393, filed on Jan. 26, 2007, in the Korean Intellectual Property Office, the entire content of which is incorporated herein by reference.

BACKGROUND OF THE INVENTION

1. Field of the Invention

Apparatuses consistent with the present invention relate to an inverter power module in the form of one board forming a power supply, which is used in driving a backlight of a liquid crystal display (LCD) device, such as an LCD monitor, an LCD television (TV), etc.

2. Description of the Related Art

The latest power supply for use in an electric/electronic device is tending toward using an inverter and a power transformer that are integrally formed on a single driving circuit board. A typical example of such an inverter power module for use in the electric/electronic device is illustrated in FIGS. 1 and 2, and a construction thereof is briefly explained as follows.

As illustrated in FIGS. 1 and 2, a general inverter power module 1 is configured, so that a power transformer 20, an inverter transformer 30 and a plurality of elements (not illustrated) are mounted on a driving circuit board 10. The inverter transformer 30 is provided with a bobbin 31 having a plurality of lead pins 31a connected to the driving circuit board 10, a first core 32 disposed in the bobbin 31, a coil 33 wound on the bobbin 31 and connected to the lead pins, and a cover 34 to accommodate the bobbin 31, the first core 32 and the coil 33.

In the general inverter power module 1 constructed as described above, a magnetic flux is generated from the inverter transformer 30 as a single inverter transformer 30 drives a plurality of LCD lamps (not illustrated) in parallel. Such a magnetic flux is emitted to heat sinks (not illustrated) or shields (not illustrated) around the inverter power module 1.

However, since the general inverter power module 1 does not block the magnetic flux generated from the inverter transformer 30 from being emitted to the outside, a problem occurs, in that an electromagnetic interference (EMI) noise is greatly generated due to the emission of the magnetic flux to the outside. For instance, as illustrated in FIG. 3, an EMI noise exceeds a generally acceptable threshold (see one-dotted line in FIG. 3) by approximately 10 dB (see dotted line in FIG. 3) in an area A due to the magnetic flux.

In addition, since the magnetic flux is transmitted to the heat sinks or shields around the inverter power module 1, a problem occurs, in that heat is generated and thus a lifespan of product is reduced.

Also, due to the emission of the magnetic flux to the outside, a problem occurs, in that a noise is generated in surrounding circuits, thereby causing the system circuit to malfunction.

SUMMARY OF THE INVENTION

Exemplary embodiments of the present invention address at least the above problems and/or disadvantages and provide at least the advantages described below. Accordingly, an aspect of the present invention is to provide an inverter transformer, which blocks a magnetic flux that is generated from the inverter transformer from being emitted to the outside, thereby allowing an EMI noise, a heating problem, a noise of the system circuit, etc., to be minimized, and an inverter power module having the same for use in an electric/electronic device.

According to one aspect of an exemplary embodiment of the present invention, an inverter power module for use in an electric/electronic device includes a driving circuit board, a power transformer mounted on the driving circuit board, an inverter transformer mounted on the driving circuit board, and a blocking unit to block a magnetic flux that is generated from the inverter transformer from being emitted to the outside.

The inverter transformer may include a bobbin having a plurality of lead pins connected to the driving circuit board, a first core disposed in the bobbin, a coil wound on the bobbin and connected to the lead pins, and a cover to accommodate the bobbin, the first core and the coil.

The blocking unit may include a first blocking unit to block the magnetic flux from being emitted above the inverter transformer.

Preferably, but not necessarily, the first blocking unit comprises a second core detachably disposed to an upper surface of the cover.

Preferably, but not necessarily, the second core is disposed side by side with respect to the first core.

Preferably, but not necessarily, the second core has a horizontal area larger than that of the first core.

Preferably, but not necessarily, the cover has an inserting groove formed in the upper surface thereof to insert the second core.

Preferably, but not necessarily, the blocking unit further includes a second blocking unit to block the magnetic flux from being emitted below the inverter transformer.

Preferably, but not necessarily, the second blocking unit comprises a third core detachably disposed with respect to a protection element installed below the driving circuit board to correspond to the inverter transformer.

Preferably, but not necessarily, the third core is disposed side by side to the first and the second cores.

Preferably, but not necessarily, the protection element has an inserting groove formed to insert the third core.

According to another aspect of an exemplary embodiment of the present invention, an inverter transformer for use in an electric/electronic device includes a bobbin, a first core disposed in the bobbin, a coil wound on the bobbin, a cover to accommodate the bobbin, the first core and the coil, and a second core disposed above the first core and the coil.

Preferably, but not necessarily, the second core is detachably disposed on an upper surface of a cover.

Preferably, but not necessarily, the cover has an inserting groove formed with respect to the upper surface thereof to insert the second core.

BRIEF DESCRIPTION OF THE DRAWINGS

These and/or other aspects and advantages of certain exemplary embodiments of the present invention will become apparent and more readily appreciated from the following description of the exemplary embodiments, taken in conjunction with the accompanying drawings, of which.

DETAILED DESCRIPTION OF EXEMPLARY EMBODIMENTS OF THE INVENTION

Figure 1:
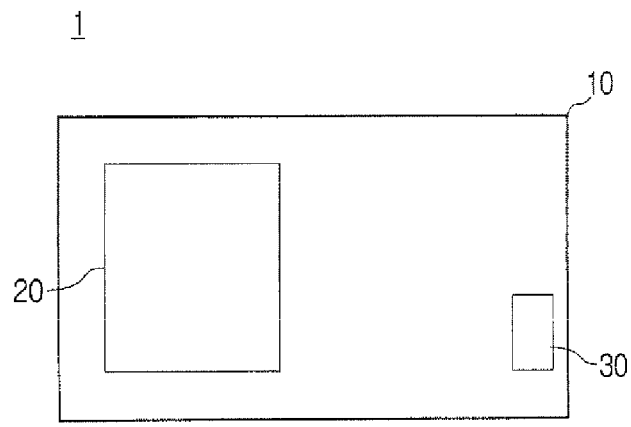
FIG. 1 is a view schematically exemplifying a general inverter power module.
Figure 2:
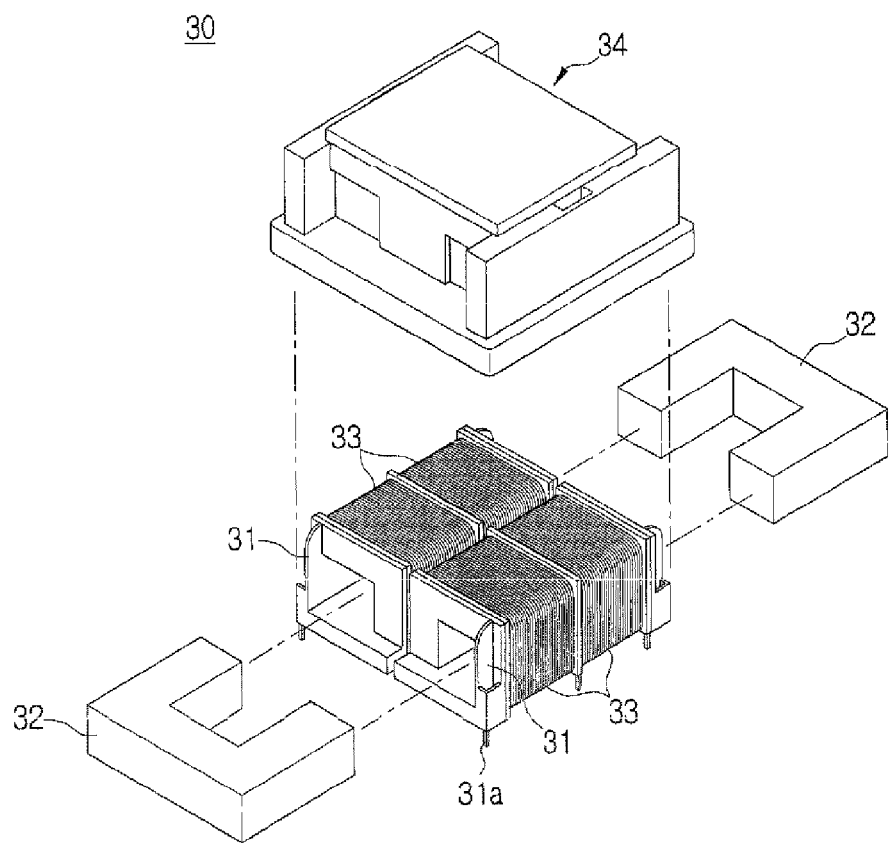
FIG. 2 is a perspective view of an inverter transformer illustrated in FIG. 1.

Reference will now be made in detail to an exemplary embodiment of the present invention, examples of which are illustrated in the accompanying drawings, wherein like reference numerals refer to like elements throughout. An exemplary embodiment is described below in order to explain the present invention by referring to the figures.

Figure 4A:
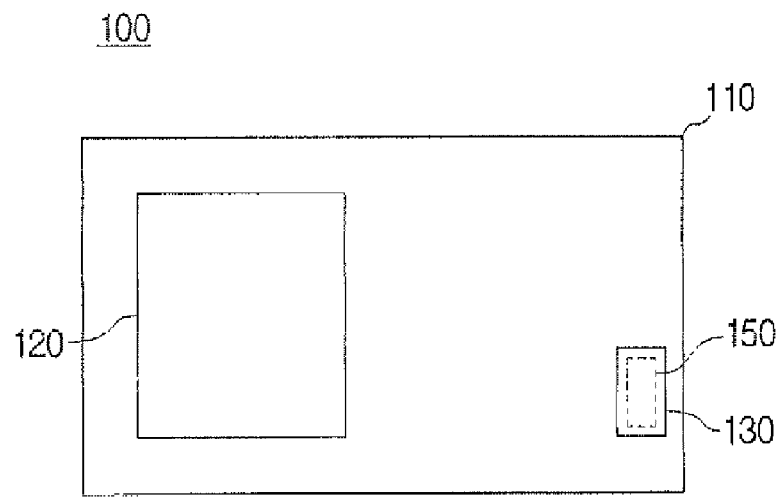
FIGS. 4A and 4B are views schematically exemplifying an inverter power module according to an exemplary embodiment of the present invention.
Figure 4B:
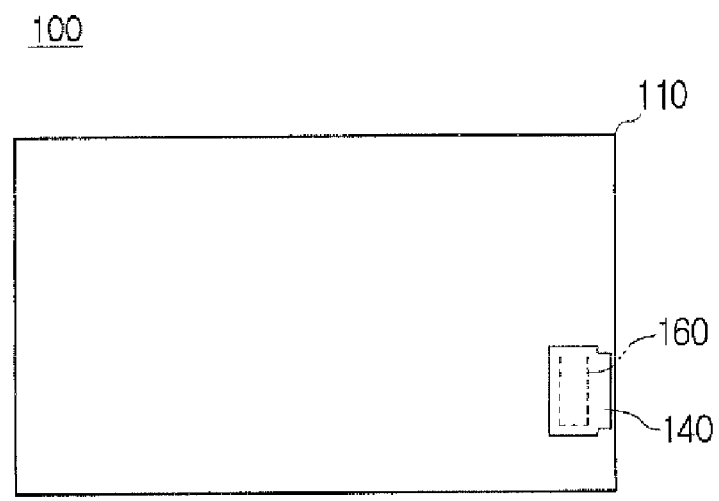
Figure 5:
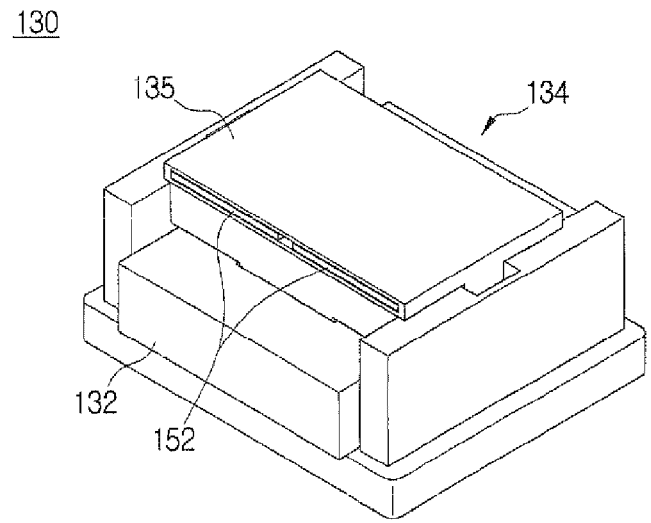
FIG. 5 is a perspective view of an inverter transformer illustrated in FIG. 4A.
Figure 6:
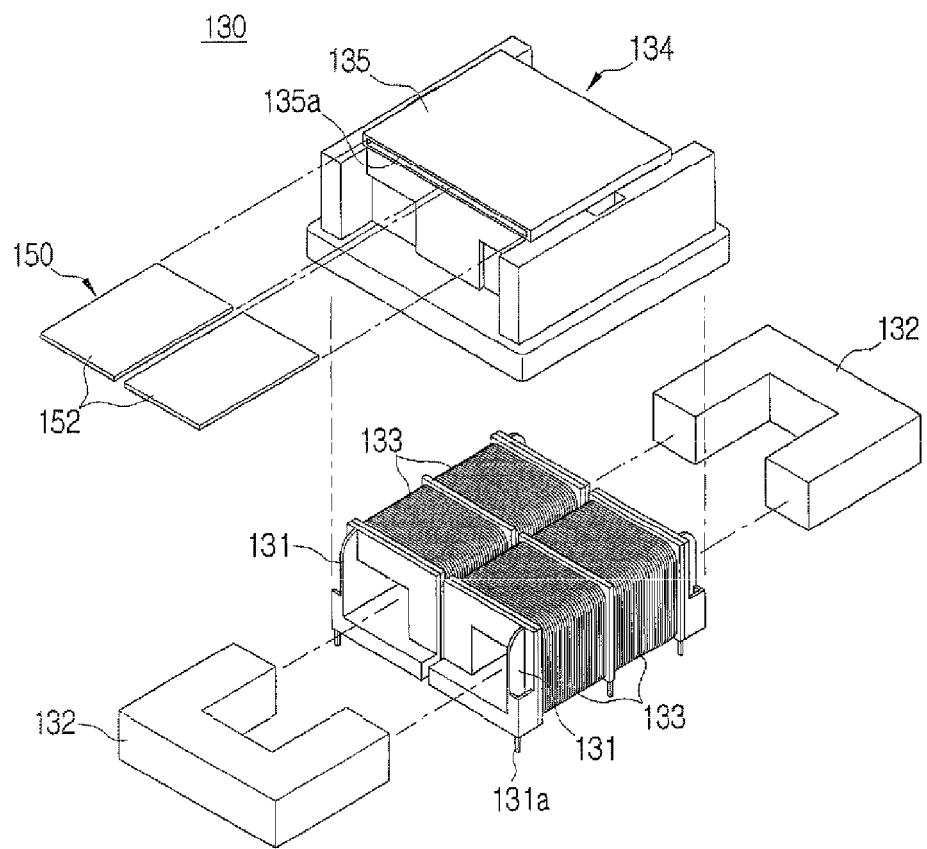
FIG. 6 is an exploded perspective view of the inverter transformer illustrated in FIG. 5.
Figure 7:
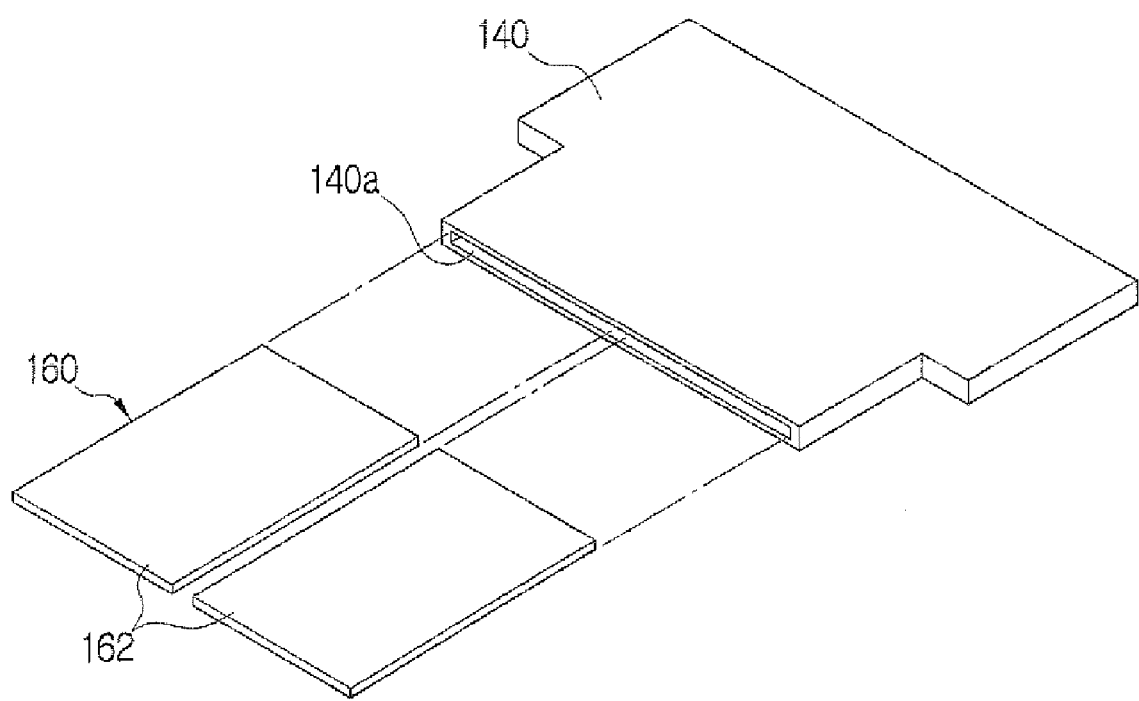
FIG. 7 is a perspective view of a protection element illustrated in FIG. 4B.

FIGS. 4A and 4B are views schematically exemplifying an inverter power module according to an exemplary embodiment of the present invention, FIG. 5 is a perspective view of an inverter transformer illustrated in FIG. 4A, FIG. 6 is an exploded perspective view of the inverter transformer illustrated in FIG. 5, and FIG. 7 is a perspective view of a protection element illustrated in FIG. 4B.

As illustrated in FIGS. 4 through 7, the inverter power module 100 according to an exemplary embodiment of the present invention includes a driving circuit board 110, a power transformer 120, an inverter transformer 130 and a blocking unit, and uses a Hot output electric power as an input electric power of the inverter transformer 130.

The driving circuit board 110 is configured in the form of one board, which drives a plurality of LCD lamps in parallel. As illustrated in FIG. 4A, on an upper surface of the driving circuit board 110 are mounted the power transformer 120, the inverter transformer 130, etc., and as illustrated in FIG. 4B, on a lower surface of the driving circuit board 110 are mounted a protection element 140, etc. On the upper and lower surfaces of the driving circuit board 110 are formed metal patterns (not illustrated), which electrically connect the respective elements mounted thereon.

The inverter transformer 130 is provided with a bobbin 131 having a plurality of lead pins 131a connected to the driving circuit board 110, a first core 132 disposed in the bobbin 131, a coil 133 wound on the bobbin 131 and connected to the lead pins, and a cover 134 accommodating the bobbin 131, the first core 132 and the coil 133.

In an upper surface 135 of the cover 134 is formed an inserting groove 135a in which a second core 152 to be described later is inserted. It is preferable, but not necessary, that the inserting groove 135a is formed side by side or parallel to a longitudinal direction of the first core 132 and the coil 133.

The blocking unit blocks a magnetic flux that is generated from the inverter transformer 130 from being emitted to the outside. The blocking unit is provided with a first blocking unit 150 to block the magnetic flux from being emitted above the inverter transformer 130, and a second blocking unit 160 to block the magnetic flux from being emitted below the inverter transformer 130.

The first blocking unit 150 comprises a second core 152. The second core 152 is inserted in the inserting groove 135a formed in the upper surface 135 of the cover 134, so that it is detachably disposed on the upper surface of the cover 134. It is preferable, but not necessary, that the second core 152 is a plate, which has a predetermined area, for example, a horizontal area larger than that of the first core 132, so as to cover upper parts of the first core 132 and the coil 133. It is preferable that the second core 152 has a thickness, which is inserted into the inserting groove 135a. It is preferable, but not necessary, that the second core 152 is constructed as at least one plate and disposed side by side to the first core 132. In this case, the second core 152 is shown comprising two plates. Also, it is preferable, but not necessary, that the second core 152 is formed of the same material as that of the first core 132. Although in the present embodiment, the second core 152 is illustrated as detachably installed to the cover 134, it can be also installed to mounting structures besides the cover 134.

The second blocking unit 160 comprises a third core 162 disposed in a protection element 140 of insulating material. The protection element 140 is installed below the driving circuit board 110 to correspond to the inverter transformer 130. Since the protection element 140 is well-known in the art, detailed description thereof will be omitted. In the protection element 140 is formed an inserting groove 140a, which accommodates the third core 162 to be detachably installed therein. It is preferable, but not necessary, that the third core 162 is constructed as at least one plate and disposed side by side to the first and the second cores 132 and 152. In this case, the third core 162 is shown comprising two plates. Also, it is preferable that the third core 162 is formed of the same material as that of the first and the second cores 132 and 152.

In the inverter power module 100 according to an exemplary embodiment of the present invention constructed as described above, as a single inverter transformer 130 drives the plurality of LCD lamps in parallel, a magnetic flux is generated from the inverter transformer 130. At this time, the first and the second blocking units 150 and 160, for example, the second and the third cores 162, which are installed above and below the inverter transformer 130, respectively, block the magnetic flux generated from the inverter transformer 130 from being emitted to the outside. To be specific, the second core 152 is inserted into the inserting groove 135a formed in the upper surface 135 of the cover 134 of the inverter transformer 130 mounted on the upper surface of the driving circuit board 110, so that it blocks the magnetic flux from being emitted above the inverter transformer 130. Also, the third core 162 is inserted into the inserting groove 140a formed in the protection element 140 installed below the driving circuit board 110, so that it blocks the magnetic flux from being emitted below the inverter transformer 130.

Figure 3:
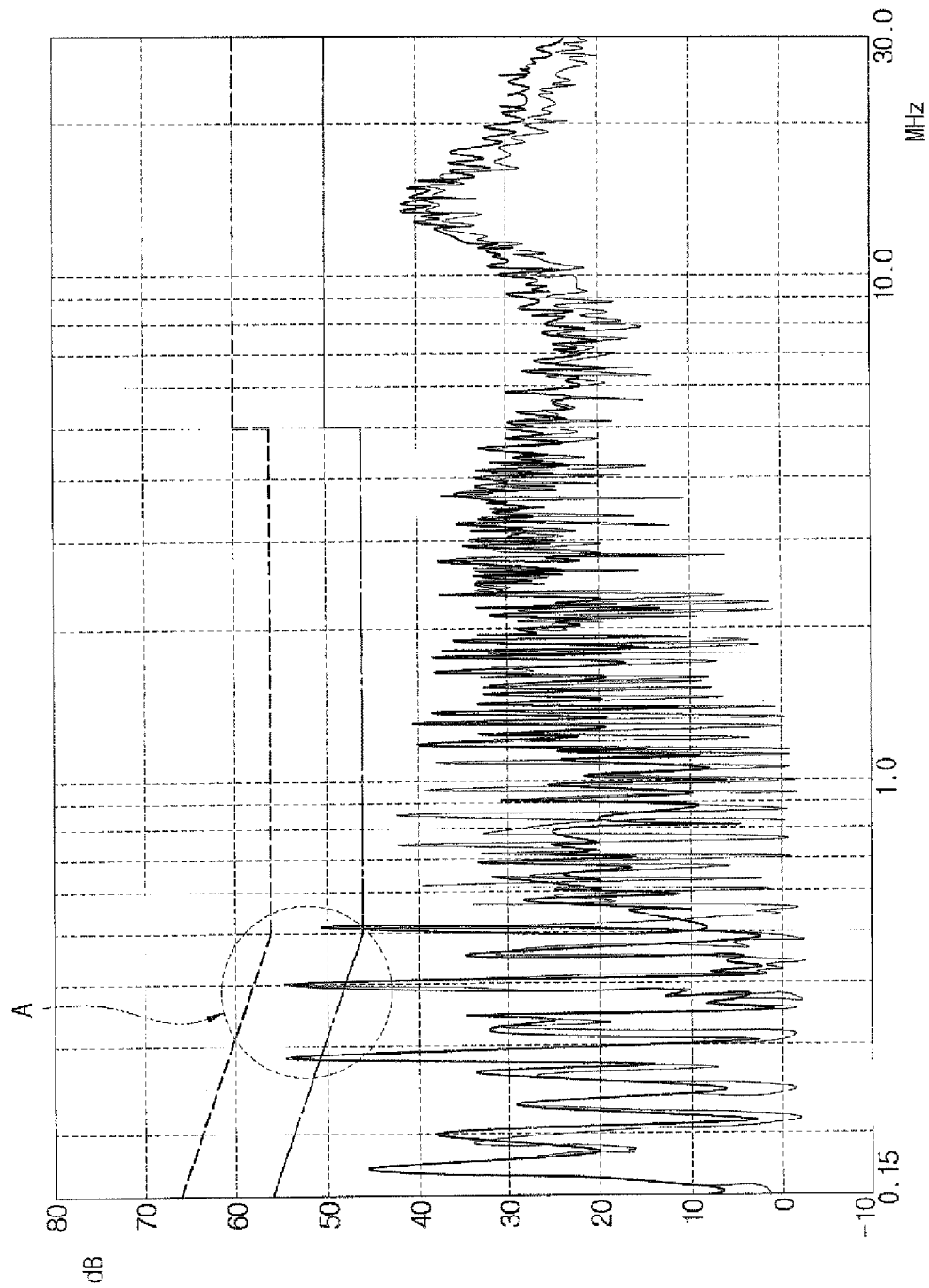
FIG. 3 is a graph exemplifying the amount of EMI noise measured from the general inverter power module.
Figure 8:
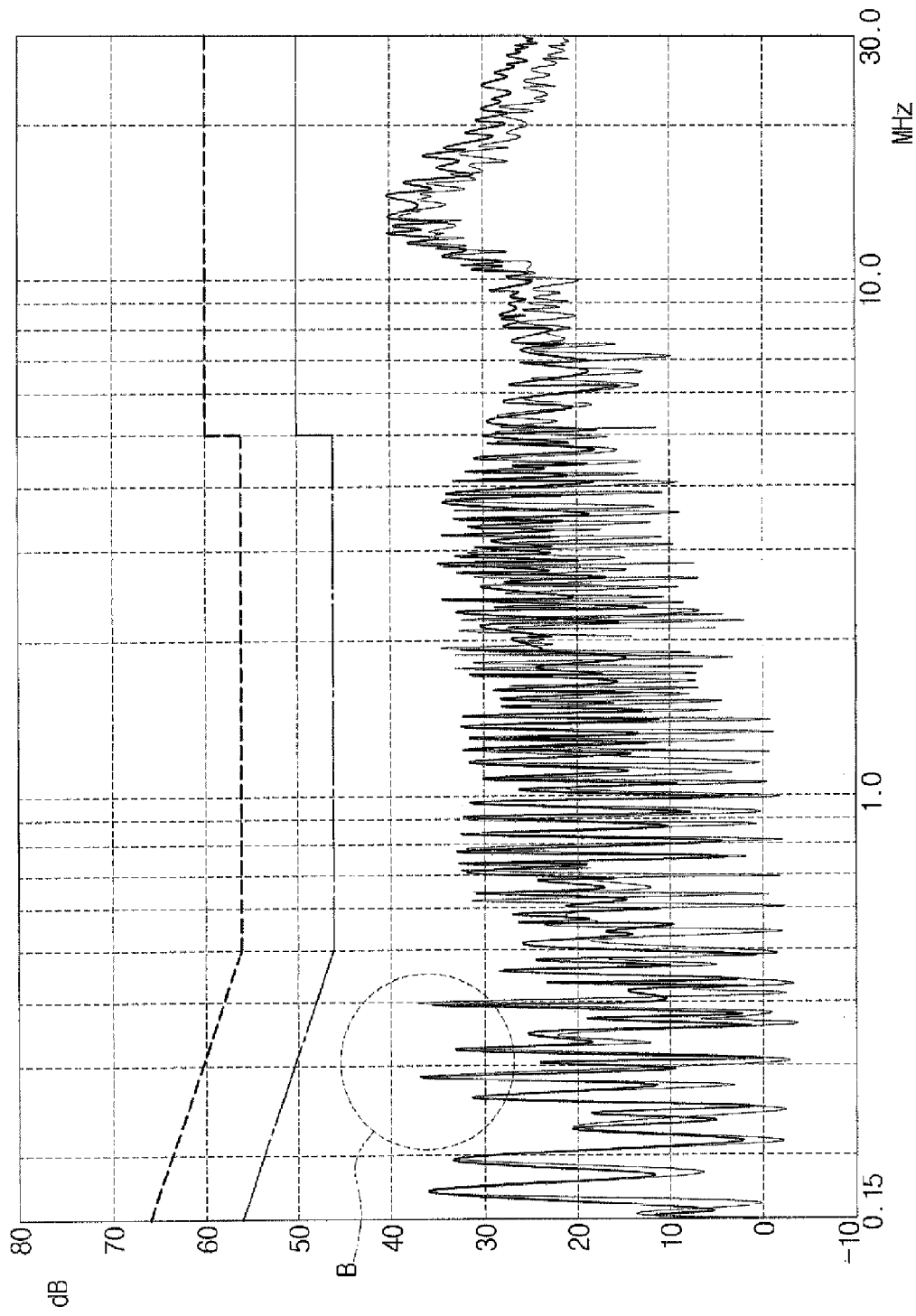
FIG. 8 is a graph exemplifying the amount of EMI noise measured from the inverter power module according to an exemplary embodiment of the present invention.

Thus, as shown in FIG. 8, according to an exemplary embodiment of the present invention, an EMI noise due to the magnetic flux is greatly reduced by approximately more than 20 dB (see an area B) when compared to the related art as shown in FIG. 3, as the magnetic flux that is generated from the inverter transformer 130 of the driving circuit board 110 is blocked from being emitted to the outside.

Also, as the magnetic flux is blocked from being transmitted to surrounding shields, the conventional problem of the increase of temperature due to the generation of heat is addressed and thus a lifespan of the product is extended.

As apparent from foregoing description, according to an exemplary embodiment of the present invention, the inverter transformer and the inverter power module having the same block the magnetic flux that is generated from the inverter transformer from being emitted to the outside, thereby reducing the EMI noise due to the magnetic flux.

Also, the inverter transformer and the inverter power module having the same according to an exemplary embodiment of the present invention block the magnetic flux from being transmitted to the surrounding shields, so that the conventional problem of the increase of temperature due to the generation of heat can be addressed and thus the lifespan of the product can be extended.

Although exemplary embodiments of the present general invention has been shown and described, it will be appreciated by those skilled in the art that changes may be made in the exemplary embodiments without departing from the principles and spirit of the invention, the scope of which is defined in the appended claims and their equivalents.

What is claimed is:

1. An inverter power module for use in an electric/electronic device, comprising:
   a driving circuit board;
   a power transformer mounted on the driving circuit board;
   an inverter transformer mounted on a first side of the driving circuit board, comprising a cover; and a blocking unit which blocks a magnetic flux that is generated from the inverter transformer from being emitted to the outside;
   wherein the blocking unit comprises a first blocking unit having a second core, and
   wherein the cover comprises an inserting groove formed therein into which the second core is detachably disposed such that the cover surrounds a top surface and a bottom surface of the second core entirely when the second core is disposed in the cover.

2. The inverter power module as claimed in claim 1, wherein the inverter transformer further comprises:
   a bobbin having a plurality of lead pins connected to the driving circuit board;
   a first core disposed in the bobbin; and
   a coil wound on the bobbin and connected to the lead pins;
   wherein the cover accommodates the bobbin, the first core and the coil.

3. The inverter power module as claimed in claim 2, wherein the second core is disposed side by side to the first core.

4. The inverter power module as claimed in claim 2, wherein the second core has a horizontal area larger than that of the first core.

5. The inverter power module as claimed in claim 2, wherein the blocking unit further comprises a second blocking unit which blocks the magnetic flux from being emitted below the inverter transformer.

6. The inverter power module as claimed in claim 5, wherein the second blocking unit comprises a third core detachably disposed to a protection element installed below the driving circuit board to correspond to the inverter transformer.

7. The inverter power module as claimed in claim 6, wherein the third core is disposed side by side to the first and the second cores.

8. The inverter power module as claimed in claim 7, wherein the protection element has an inserting groove formed to insert the third core.

* * * * *